May 24, 1932.  O. R. WIKANDER  1,860,122

SPRING

Filed Aug. 1, 1927

Inventor:

Oscar R. Wikander,

By Paul E. Schilling,

Attorney

Patented May 24, 1932

1,860,122

UNITED STATES PATENT OFFICE

OSCAR R. WIKANDER, OF PITTSBURGH, PENNSYLVANIA, ASSIGNOR TO EDGEWATER STEEL COMPANY, OF PITTSBURGH, PENNSYLVANIA, A CORPORATION OF PENNSYLVANIA

SPRING

Application filed August 1, 1927. Serial No. 209,984.

This invention relates to springs of that type designed for cushioning or shock-absorbing purposes, and has for its object the production of a spring which is distingushed from others of its type by its materially increased cushioning or shock-absorbing capacity. In the case of a ring spring outer and inner sets of closed or split rings are subjected, in a cushioning or shock-absorbing action, to tension and compression strains, and the forces acting on the sectional areas of the tension rings and compression rings respectively are approximately equal. If, therefore, the rings are made of metal of the same quality, and the section, i. e., cross-sectional form and area, of the rings of both sets is the same, it is generally assumed that the tensional strain in one set of rings will be of the same value as the compressional strain in the other set of rings. Although this is in general quite true, it has been empirically established that the fatigue limit is much lower in the case of the rings subjected to tensional strains than it is in the case of the rings subjected to compressional strains, that is to say, that if two bodies are subjected to the same tension and compression strains, the compressed body will stand a multiple of the loading change which the expanded body is subjected to. Therefore, because of fatigue limit differences between the two sets of rings, the useful life of one set is far short of that of the other set. As it is desirable, however, that both sets of rings have the same effective length of life, the compression rings of such a ring structure should be of such character that their fatigue limit will accord, or substantially so, with that of the tension rings. This may be accomplished by the obvious expedient of making tension rings of better material, at the sacrifice of increased cost. My invention, however, provides a novel construction of the rings whereby the load strains are sustained in such proportions by the two sets of rings that the fatigue limit in both sets of rings is approximately the same, such construction at the same time ensuring the production of rings of better inherent quality without added cost.

The essential feature of the invention resides in a change in the cross-sectional area (thickness) of the rings, whereby the fatigue limit of the outer rings is increased to the extent of that of the inner rings. Another feature of this invention resides in a novel shaping of the outer faces of the outer rings and the inner faces of the inner rings so that a more regular and even heating and tempering of the rings in their manufacture is obtained, better quality rings produced, and the formation of the rings by rolling facilitated and rendered easier. To this end the said outer faces of the outer rings and inner faces of the inner rings are formed as rotation surfaces with a curved generation line, i. e., are longitudinally concaved, with the result that rings of concavo-convex cross-sectional shape and of substantially uniform thickness are produced. Within the scope of the invention, the same principle with resultant advantages may be used in the manufacture of compound helical springs for cushioning and shock-absorbing purposes, as hereinafter described.

Certain exemplifications of the invention are illustrated in the accompanying drawings in which:—

Figure 1:
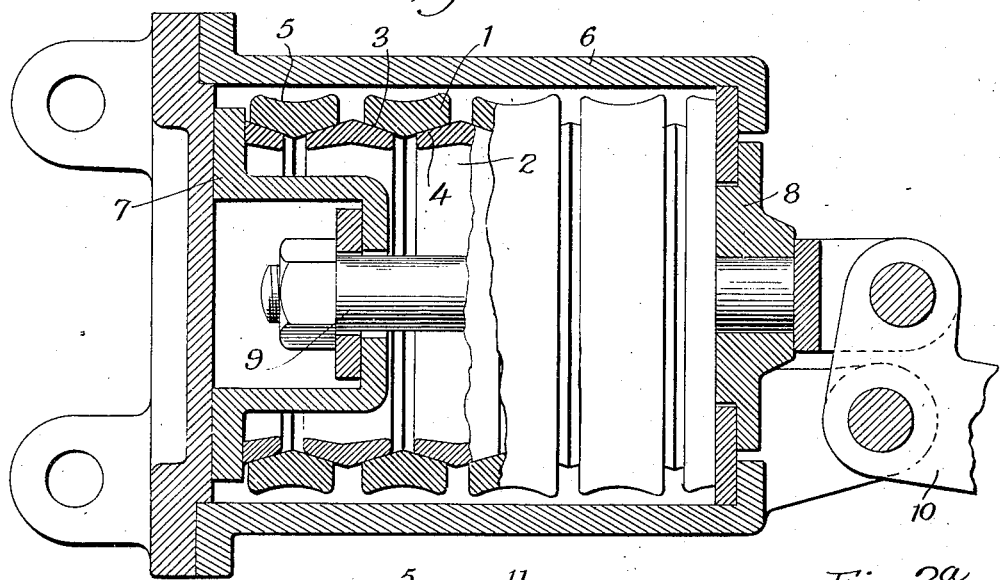
Figure 1 is a view, partly in elevation and partly in longitudinal section, of a ring spring constructed in accordance with the invention and shown as used as a shock-absorber.

Referring now more particularly to Figure 1 of the drawings, the ring spring structure comprises a set of outer ring spring members 1 and a set of inner ring spring members 2, the rings 1 being provided with inclined or double conical inner faces 3, in contact with the correspondingly shaped inclined or double conical outer faces 4 of the rings 2. The outer rings 1 are of relatively greater cross-sectional thickness or area than the inner rings, the difference in thickness being such as to make the fatigue limits for both sets of rings approximately the same. Preferably the inclined or conical surfaces 3 and 4 of each ring are of like extent and converge at equal angles between the top and bottom faces of the ring and the circumferential center of the ring where they meet. The cone face of each ring, therefore, is of convex form in the ring section. The relatively outer faces of the rings, that is to say, the outer face of each ring 1 and the inner face of each ring 2, is shaped as a rotation surface with a curved generation line, each such face 5 of the ring being annularly grooved and of concaved cross-section, instead of being as usual of cylindrical outline. By such construction each ring member is made of concavo-convex cross-section and of substantially uniform cross-section or thickness. This provides a ring member which may be more uniformly heated and tempered throughout its sectional area and more readily and conveniently manufactured by a rolling operation. A ring of better material may thus be produced at a cost less than and in any event not exceeding that of a ring of ordinary form, as a result of which, by proper dimensioning of the rings, the fatigue limits of both sets of rings may be made substantially equal. The durability of the spring structure as well as its cushioning or shock absorbing capacity will be greatly increased over ring spring structures of the types heretofore used or suggested.

In Figure 1 the ring spring structure is shown as arranged for use as a component part of a shock absorber, including a casing 6 in which the spring is disposed between abutment heads or followers 7 and 8, a rod 9 passing from and being operatively coupled to the heads and to a motion transmitting or receiving member 10 the action of which is to be controlled.

Figure 2:
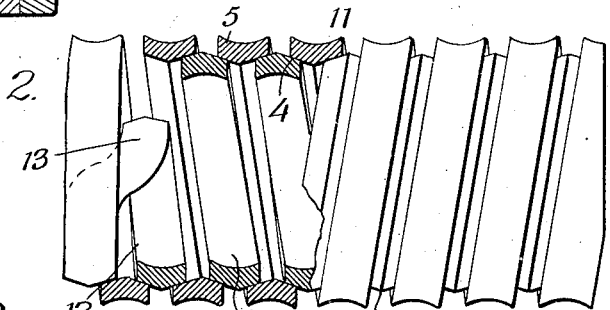
Figure 2 is a similar view of a compound or double helical spring embodying the principle of the invention.
Figure 2A:
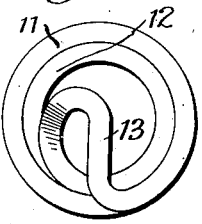
Figure 2a is an end view of the spring shown in Figure 2 on a reduced scale.

In Figure 2 the principle of the invention is shown as embodied in a double helical spring consisting of an outer spring element 11 and an inner spring element 12, the latter lying within the former and the convolutions of said spring elements, constituting integrally connected spring members, being of the same cross-sectional shape as the ring spring members shown in Figure 1 and being provided with the inclined or conical faces 3—4 and concaved face 5 as in the case of the ring spring members. The end convolutions of the spring elements 11 and 12 may be integrally or otherwise connected by a torsional portion, as indicated at 13, at either or both ends of the spring structure. This construction adapts the spring elements to move conjointly in the axial direction, that is, to contract and expand, though preventing tangential movements of the connected end convolutions, as will be readily understood. This type of spring structure may be employed whenever it is desired in place of a strictly ring spring structure for performing cushioning or shock absorbing actions.

Figure 3:
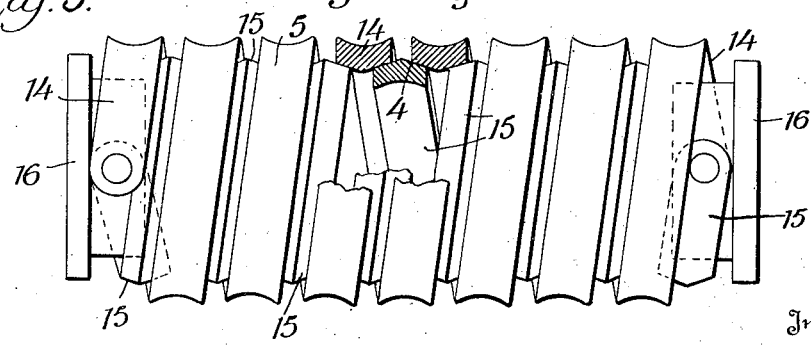
Figure 3 is a similar view of another form of double helical spring construction.

In Figure 3 of the drawings a double helical spring is shown comprising outer and inner spring elements 14 and 15, similar to the spring elements 11 and 12 shown in Figure 2, except that the end convolutions of the springs are separate from and independent of connection with each other, but are pivotally connected at opposite sides of the spring structure, and at its respective ends, to followers, heads or untorsional abutment members 16. This type of construction permits the spring elements to move conjointly for expansion and contraction, while preventing tangential movements of the end portions of each individual spring, but permitting tangential movements of the end portions of the two springs toward and from one another.

When axial pressure is applied to the spring elements of either helical spring structure disclosed, the conical surfaces of the convolutions or spring elements of the springs are pressed together, so that the outer spring will expand outwardly and the inner spring will expand inwardly, thus giving the required cushioning or shock absorbing effect.

Having thus fully described my invention, I claim:—

1. A spring embodying an outer spring member and an inner spring member, the former of greater cross-sectional dimensions than the latter, each spring member having a concaved face and a convex face, the convex faces of the spring members being in engagement with each other.

2. A spring embodying an outer spring member and an inner spring member, the former of greater cross-sectional dimensions than the latter, said spring members being cross-sectionally of concavo-convex form, the convex faces of the spring members being opposed and in engagement with each other.

3. A spring embodying sets of outer and inner ring members having engaging inclined faces, each ring member being cross-sectionally of substantially uniform thickness, and the outer ring members being of greater cross-sectional thickness than the inner members.

4. A spring embodying an outer spring member and an inner spring member, the one of greater cross-sectional dimensions than the other, each spring member having a concaved face and a convex face, the latter comprising equilateral inclined surfaces extending inwardly from the side edges of the member on converging lines and intersecting each other at a point coincident with the circumferential center of said member, the convex faces of the spring members being in engagement with each other.

5. A spring embodying an outer spring member and an inner spring member, the one of greater cross-sectional dimensions than the other, each spring member having a concaved face and a convex face, the former extending uniformly on an arcuate line between the side edges of the member and the latter comprising equilateral inclined surfaces extending inwardly from the side edges of the member on converging lines and intersecting each other at a point coincident with the circumferential center of said member, the convex faces of the spring members being in engagement with each other.

6. A spring embodying an outer spring member and an inner spring member, the one of greater cross-sectional dimensions than the other, each spring member having a concaved face and a convex face, the latter comprising equilateral inclined surfaces extending inwardly from the side edges of the member on converging lines and intersecting each other at a point coincident with the circumferential center of said member, the convex faces of the spring members being in engagement with each other.

7. A spring embodying an outer spring member and an inner spring member, the one of greater cross-sectional dimensions than the other, each spring member having a concaved face and a convex face, the former extending uniformly on an arcuate line between the side edges of the member and the latter comprising equilateral inclined surfaces extending inwardly from the side edges of the member on converging lines and intersecting each other at a point coincident with the circumferential center of said member, the convex faces of the spring members being in engagement with each other.

8. A spring embodying a series of outer ring members and a series of inner ring members, the members of one series being alternately arranged in respect to the members of the other series and interengaged therewith in inclined surfaces of contact, the transverse cross sectional area of the members of the said outer series being sufficiently greater than the transverse cross sectional area of the members of the inner series to substantially compensate for the difference between the tensile and compression characteristics of the material.

9. A spring comprised of alternately arranged outer continuous tension rings and inner compression rings, said outer rings having a transverse sectional area greater than the transverse sectional area of the inner rings in amount substantially sufficient to compensate for the difference between the strength of the inner rings under compression and the strength of the outer rings under tension.

10. A spring employing a series of outer ring members and a series of inner ring members, the members of one series being alternately arranged with respect to the members of the other series, and interengaged therewith in inclined surfaces of contact, the transverse cross-sectional area of the members of said outer series being substantially inversely proportional to the transverse cross-sectional area of the members of the inner series in the relation of the fatigue limits of the material of said inner and outer ring members.

11. A spring embodying a series of outer ring members and a series of inner ring members, the members of one series being alternately arranged in respect to the members of the other series, and interengaged therewith in inclined surfaces of contact, the transverse cross-sectional area of the members of the outer series being greater than the transverse cross-sectional area of the members of the inner series in compensation for the difference in fatigue limits of the two series of ring members.

In testimony whereof I affix my signature.

OSCAR R. WIKANDER.